US006406542B1

(12) United States Patent
Stepancik

(10) Patent No.: US 6,406,542 B1
(45) Date of Patent: Jun. 18, 2002

(54) EQUIPMENT FOR TREATMENT OF WORKPIECES

(75) Inventor: Helmut Stepancik, Achau (AT)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 09/416,549

(22) Filed: Oct. 12, 1999

(30) Foreign Application Priority Data

Oct. 19, 1998 (EP) ............................................ 98811039

(51) Int. Cl.[7] ................................................ B65G 49/02

(52) U.S. Cl. ........................ 118/635; 118/630; 118/633; 204/202; 204/297.06; 204/297.09

(58) Field of Search ................................ 118/635, 640, 118/630, 633, 72, 73, 66, 503, 423, 50.1, 620, 621; 204/196, 202, 297.06, 297.09, 297.16, 297.01

(56) References Cited

U.S. PATENT DOCUMENTS

| | | | | |
|---|---|---|---|---|
| 2,938,850 A | | 5/1960 | Nali | 204/297 |
| 4,148,707 A | * | 4/1979 | Mayer et al. | 204/202 |
| 4,331,230 A | * | 5/1982 | Buckley | 198/484 |
| 4,844,783 A | | 7/1989 | Takahashi et al. | 204/180.2 |
| 4,966,672 A | | 10/1990 | Levit et al. | 204/198 |
| 5,160,782 A | * | 11/1992 | Hickman | 428/245 |

FOREIGN PATENT DOCUMENTS

| | | | |
|---|---|---|---|
| DE | 3527729 | 2/1987 | B05C/3/10 |
| DE | 195261613 | 1/1997 | F26B/19/00 |
| FR | 2512696 | 3/1983 | B05C/13/00 |
| GB | 1400698 | 7/1975 | C25D/17/06 |
| GB | 1467715 | 3/1977 | C25D/17/28 |

* cited by examiner

*Primary Examiner*—Richard Crispino
*Assistant Examiner*—Yewebdar T Tadesse
(74) *Attorney, Agent, or Firm*—Schweitzer Cornman Gross & Bondell, LLP

(57) ABSTRACT

In equipment for powder-coating, workpieces such as escalator steps are subjected to a current treatment in an anodizing unit. A conveying means advancing carriers for the workpieces is lowered over a tank so that the workpieces in transit are immersed in and continue transit within a bath and after a specific dwell time are lifted back out of the bath at the end of the tank. Arranged in the tank region is a current feed, such as a bus bar, which extends parallel to the travel path of the conveying means. Each carrier is provided with a current take-off which connects the carrier with the current feed. The current connection is produced on lowering the carrier into the bath and interrupted on raising the carrier from the bath.

4 Claims, 3 Drawing Sheets

EQUIPMENT FOR TREATMENT OF WORKPIECES

BACKGROUND OF THE INVENTION

Large workpieces, such as for example escalator steps or moving walkway plates, can be provided with a color coating, wherein the color coating is applied by means of, for example, a powder coating process. The workpieces are in such a case pretreated, powder coated, and subsequently post-treated. The pretreatment may comprise, for example, degreasing and washing, followed by anodizing and then, for example, washing and drying. The post-treatment may comprise, for example, stoving or baking of the coloration powder applied to the workpiece. Apart from the anodizing, the workpieces are treated in a continuous running process, wherein the workpieces continuously run or pass through a treatment unit and remain in the treatment unit for a predetermined transit time. Large currents are necessary for the anodizing of large workpieces with correspondingly large surfaces, such as for example escalator steps or moving walkway plates provided with ribs, and the loading of the anodizing tank has to be undertaken in individual batches. The workpieces are moved from the conveying means of the preceding treatment unit, wherein several workpieces are arranged in suitable basket-like trusses or on common carriers, are immersed in the tank and are connected to current cables. After the current treatment the trusses or carriers are lifted out of the task and transferred to the conveying means of the succeeding treatment unit.

A disadvantage of the known powder coating process is the batch-by-batch production sequence for the anodizing. The loading and unloading of the anodizing tank in batches limits the production output of the entire powder-coating plant.

BRIEF DESCRIPTION OF THE INVENTION

The present invention avoids the disadvantages of the known equipment and provides equipment for surface treatment, by means of which a noticeable increase in productivity in achievable.

The advantages achieved by the invention are essentially to be seen in that all treatment steps can be carried out in continuous running operation, wherein merely a single continuously moving conveying means is needed for conveying the workpieces. The continuous running treatment improves the quality of the workpiece surface and increases the output of the plant as well as, in addition, being less personnel intensive.

In accordance with the invention, equipment for treatment of workpieces consists of at least one unit for treating the surface of the workpieces. In at least one of the units the workpieces are treatable by high currents its the workpieces continuously run through the equipment. A current feed is provided for the workpieces, to which carriers which transport the workpieces are connected. The carriers travel along a track which may allow the workpieces to pass continuously through pre-treatment, high-current treatment, and post-treatment stages.

The carrier may comprise a retaining device for the workpiece and means for passing the current into the workpiece. In a preferred embodiment the retaining device may take the form of a fork-shaped bracket with first and second limbs each with first and second retaining claws to hold the workpiece. The retaining claws may be provided with contact surfaces for current introduction into the workpiece.

BRIEF DESCRIPTION OF THE DRAWINGS

The invention is explained in more detail is the following description by reference to a preferred but nonetheless illustrative embodiment, when considered in association with the annexed drawings, in which.

DETAILED DESCRIPTION OF THE INVENTION

Figure 1:
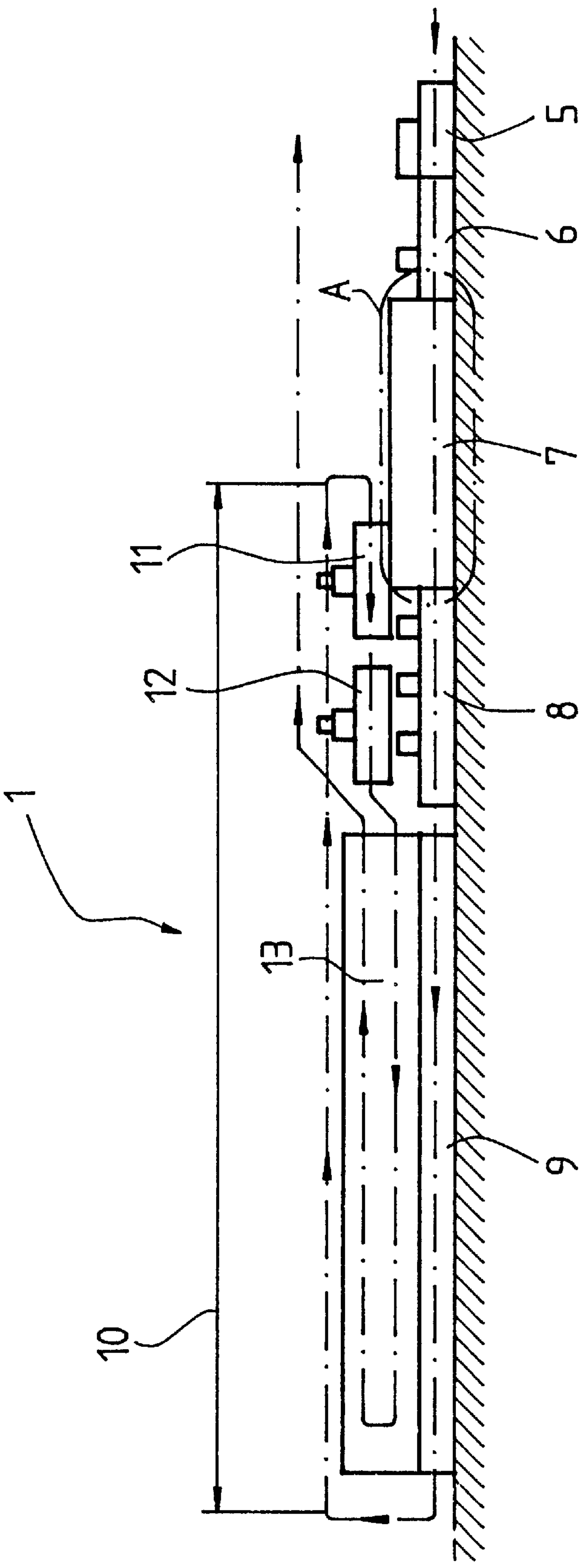
FIG. 1 is a schematic illustration of the invention for surface treatment of workpieces.

In accordance with the invention, equipment for powder coating of workpieces 2, for example escalator steps or moving walkway plates of die-cast aluminum is designated by 1 in FIGS. 1 to 6. Other workpieces, such as for example car wheel rims, can be surface treated or powder coated by the same equipment. Not illustrated is a loading region in which, for example, a workpiece 2 is mounted upon a carrier 3. The carriers 3 are continuously movable by means of an endless conveyor means 4 through the powder coating equipment 1, for example at 2.5 meters per minute. After the passage through the powder coating equipment 1 the workpieces 2 are removed from the transiting carriers 3 in an unloading region, which is also not illustrated. Dwell time and treatment temperature in the treatment units are dependent on the nature of the surface, the material, the topography of the surface, etc., of the workpiece 2 to be treated and can deviate from the indicated values as set forth herein.

At the start of the powder coating process, the workpieces 2 run through a degreasing unit 5, in which they are degreased, for example, at a temperature of about 70° C. and with a dwell time of about 50 seconds. Subsequently, the workpieces 2 pass through a first washing unit 6 with a dwell time of about 30 seconds. In a current treatment unit 7, also called anodizing unit 7, connected downstream of the first washing, the workpiece surface is treated with a high current for, for example, two minutes at 25° C. Details relating to the current treatment are explained further below. After the current treatment, the workpieces 2 are washed in a second washing unit 8. This process lasts about 90 seconds. In the downstream drying unit 9, the washing water still adhering to the workpiece is removed through a drying cycle of about nine minutes and at about 50° C. A first cooling path 10, on which the workpieces 2 cool down after the drying unit 9 for about 23 minutes, is provided for cooling the workpieces 2. The workpieces are now fully prepared for the application of the coloration powder in a first powder unit 11 or a second powder unit 12. The second powder unit 12 can also be bypassed. The workpieces are sprayed with coloration powder in the powder unit 11, 12, wherein the electrically charged coloration powder fixes to the workpiece 2. The powdered workpieces 2 remain in the subsequent baking or stoving unit 13 for, for example, about 16 minutes at about 220° C., wherein the powder particles fuse into a solid layer by the action of the heat. After the stoving, the workpieces 2 remain in a second cooling area, which in not illustrated, for, for example, 16 minutes. Thereafter, the finally coated workpieces 2 pass to the above-mentioned unloading region.

Figure 2:
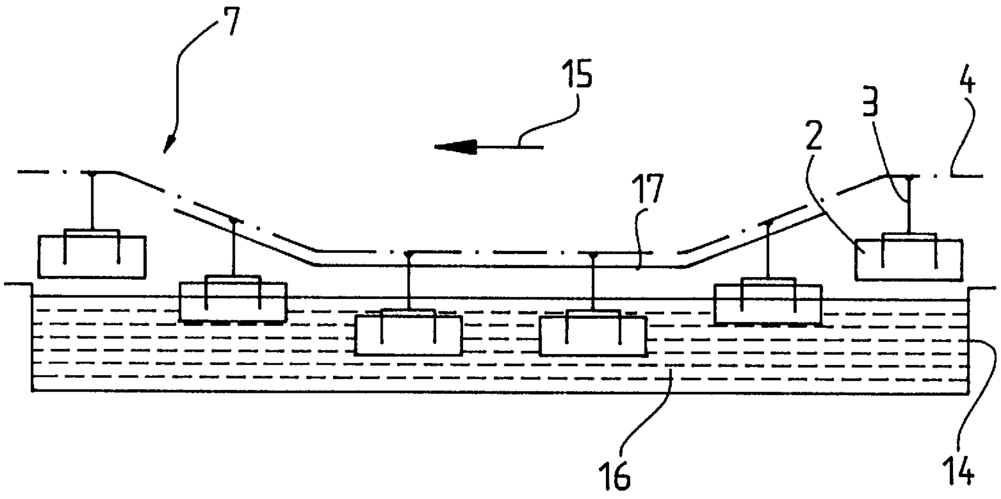
FIG. 2 is an illustration of a unit for current treatment of workpieces in transit as utilized in the invention.

FIG. 2 shows a detail, which in designated by A in FIG. 1, of the equipment 1 for the powder coating, wherein the section A shows the current treatment or anodizing unit 7. The conveying means 4 advancing the carriers 3 is lowered over a tank 14, so that the workpieces 2, as seen in throughflow direction 15, are immersed in a bath 16 and after the above-mentioned dwell time are lifted out of the bath 16 again at the and of the tank. A current feed 17, for example a bus bar, which extends parallel to the track of the conveying means 4, is arranged in the tank region. Each carrier 3 is provided with a current take-off 18 with, for example, wiper or roller contacts, which electrically connect the carriers 3 with the current feed. For optimum utilization of the tank length, the connection is produced on lowering the carrier 3 and interrupted on raising the carrier 3. Corrosion protection and adhesion properties are improved by the continuous current treatment.

The current flows from the current feed 17 by way of the current take-off 18 to the carrier 3 and from the carrier 3 to the workpiece 2, from the workpiece 2 to the bath 16 and from the bath to the tank 14. Large currents or current intensities in the order of magnitude of about 2 A/dm$^2$ have to be conducted by the workpiece 2 in the current treatment. This results, for example in the case of a surface area of 3 square meters of an escalator step, in a current intensity of about 600 A per escalator step at a voltage of 18 to 20 volts. Due to these current intensities and the introduction thereof into the workpiece 2, the expert world was previously of the view that current treatment or anodizing was not able to be performed in a continuously running process. A further obstacle was represented by the demands on the carrier 3 of the workpiece 2, namely requirements for low resistive impedance due to the transfer of large currents, largely corrosion-resistant, temperature-resistant and oxidation-resistant contact surfaces and a simple retention of the workpiece with sufficient contact area for the current introduction.

Figure 3:
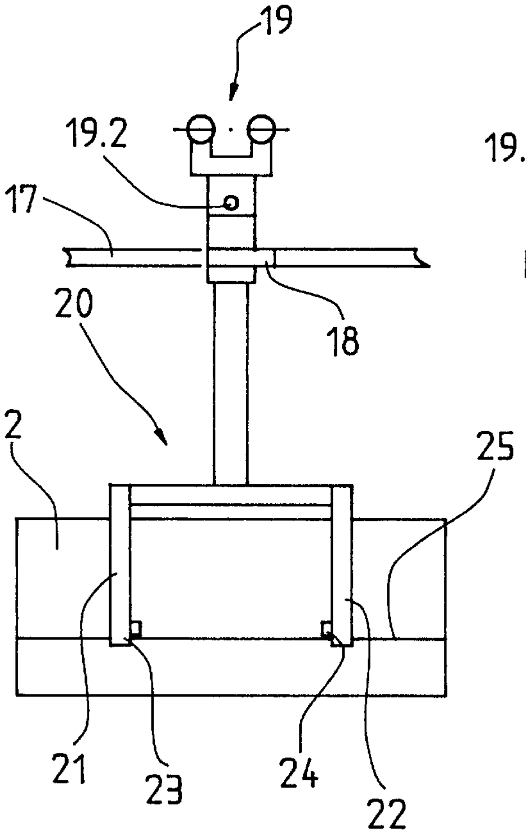
FIG. 3 is a front view of a carrier for the continuous transport of a workpiece in accordance with the invention.
Figure 4:
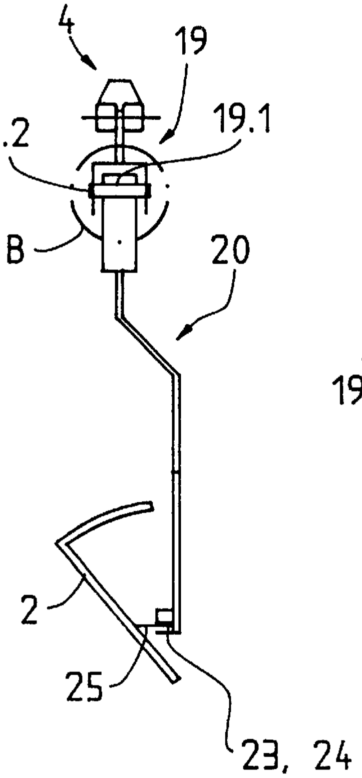
FIG. 4 is a side view of the carrier.

FIG. 3 and FIG. 4 show a carrier 3 which meets the above-mentioned demands. The yoke-shaped carrier 3 consists of a chassis 19, which stands in operative connection with the conveying means 4, of the further above-mentioned current take-off 18, of an insulating member 19.1 arranged between the chassis 19 and a bracket 20 and of the fork-shaped bracket 20 with a first limb 21 and a second limb 22, wherein a first retaining claw 23 and a second retaining claw 24 are respectively arranged at the limbs 21 and 22. The escalator step 22 shown in FIG. 3 and FIG. 4 has a rearward rib 25, at which the escalator step 2 is firmly held by the retaining claws 23 and 24. The fork-shaped retaining claws 23 and 24 together with the rib 25 form, through tilting due to the action of gravitational force upon the escalator step 2, a self-retaining connection, by way of which connection the abovementioned current has to flow for the current treatment. In the case of aluminum, 1 square millimeter per 1 A is needed for the current transfer. If the retaining claws 23 and 24 consist of titanium, 1 square millimeter per 0.1 A is needed for the current transfer. In the case of a treatment current of 500 A, as area of 5 centimeters by 5 centimeters is necessary for each retaining claw 23 or 24 for titanium.

Figure 5:
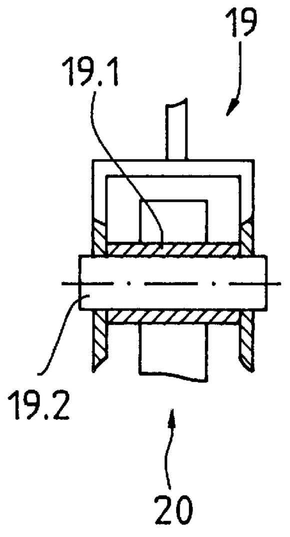
FIG. 5 is a partial detail view of the carrier.

FIG. 5 shows a detail, which in designated by B in FIG. 4, of the electrical insulation of the bracket 20 relative to the chassis 19. A pin designated by 19.2 is held by the chassis 19. The insulating member 15.1 encloses the pin 19.2, whereby the insulating member 19.1 at the bracket 20 supported by the pin 19.2 is electrically insulated relative to the chassis 19.

Figure 6:
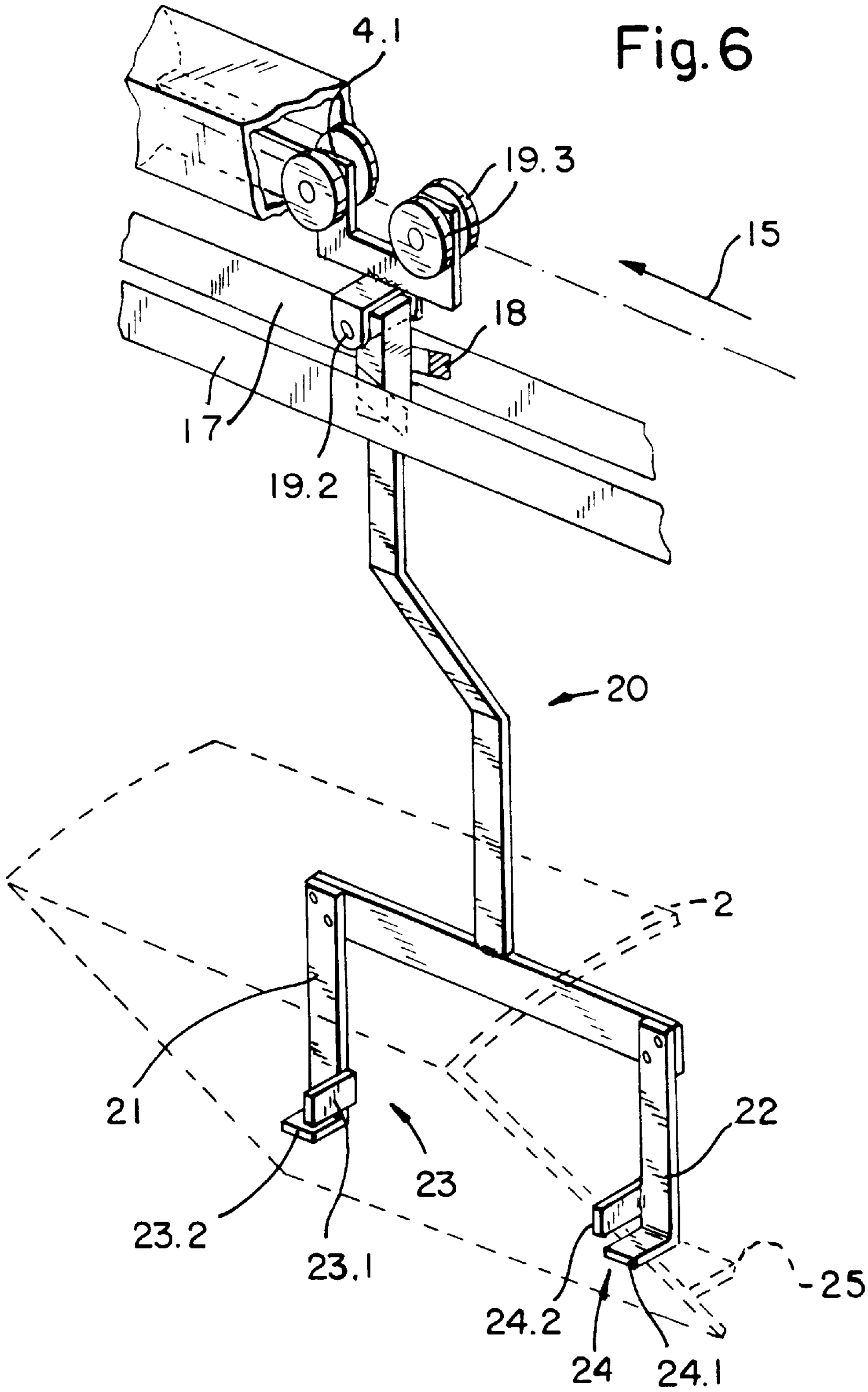
FIG. 6 is a perspective view of the carrier.

FIG. 6 shown details of the carrier 3 and the conveying means 4. The chassis 19 comprises rollers 19.3 which are guided by means of a C-shaped track 4.1. The track 4.1 is a component of the conveying means 4, wherein the carrier drive is not illustrated. The current take-offs 18 arranged at the bracket 20 are constructed as resilient contacts, which wipe along the current feed 17 constructed as a bus bar and arranged at each bracket side. The first retaining claw 23 consists of a first carrier plate 23.1 and a first retaining plate 23.2. The second retaining claw 24 consists of a second carrier plate 24.1 and a second retaining plate 24.2. As mentioned further above, the rearward rib 25 of the escalator step 2 is arranged between the carrier plates 23.1, 24.1 and the retaining plates 23.2, 24.2 and wedges therebetween under the action of gravity. The surfaces of the carrier plates 23.1, 24.1 and the retaining plates 23.2, 24.2 are so dimensioned that the contact surface for current introduction into the workpiece as illustrated further above is maintained thereby by the contact between the plates and the rearward rib 29 secured therebetween.

The above-mentioned unit 7 for surface treatment of workpieces 2 in continuous running operation by means of high currents can also be used individually or in other surface treatment equipment, which does not utilize powder coating of workpieces

I claim:

1. Equipment for treatment of workpieces having at least one unit for treating the surface of the workpieces by high current in a continuous running operation, the surface treating units comprising a current feed for the workpieces, and a carrier for continuous run and support of workpieces connected thereto, the carrier comprising a retaining device for a workpiece and a device for current introduction into the workpiece, the workpiece hanging downwardly from the retaining device, the retaining device being in the form of a fork-shaped bracket with first and second limbs, each of said limbs having a retaining claw to accept an edge of the workpiece, each claw having first and second contact surfaces projecting outwardly from the limb, the first contact surface forming a pivot point for the edge of the workpiece about which the workpiece tilts, the second contact surface located and spaced above the first contact surface and forming a stop against which the workpiece edge abuts when tilted, the workpiece being suspended from the retaining device and being retained by and in contact with the retaining device solely by the pivoting action of the workpiece about the first contact surface and abutment with the second contact surface.

2. Equipment according to claim 1, characterized in that the first and second contact surfaces introduce current into the workpiece.

3. Equipment according to claim 1, characterized in that current take-offs, which stand in contact with a current feed during transit through the current-treating unit, are arranged at the bracket.

4. Equipment according to claim 3, wherein the carrier further comprises a chassis in operating connection with a conveying means, the chassis supporting an insulating member for the electrical insulation of the bracket relative to the chassis, and a pin supported by the insulating member and in connection with the bracket.

* * * * *